US008398049B2

(12) United States Patent
Lategan (10) Patent No.: US 8,398,049 B2
(45) Date of Patent: Mar. 19, 2013

(54) MULTI-FUNCTIONAL INFANT CARE AND ORGANIZER SYSTEM AND ASSOCIATED METHODS

(76) Inventor: Eugene Lategan, Gauteng (ZA)

( * ) Notice: Subject to any disclaimer, the term of this patent is extended or adjusted under 35 U.S.C. 154(b) by 308 days.

(21) Appl. No.: 12/853,516

(22) Filed: Aug. 10, 2010

(65) Prior Publication Data
US 2012/0037767 A1 Feb. 16, 2012

(51) Int. Cl.
*F16M 13/00* (2006.01)
(52) U.S. Cl. .................. 248/558; 248/125.3; 248/125.7; 108/95; 5/655
(58) Field of Classification Search .................. 248/558, 248/102, 105, 121, 122.1, 125.1, 125.3, 125.7, 248/408, 912; 5/655; 108/13, 95, 108, 155
See application file for complete search history.

(56) References Cited

U.S. PATENT DOCUMENTS

| | | | |
|---|---|---|---|
| 62,010 A | 2/1867 | Cogshall | |
| 575,711 A * | 1/1897 | Haley | 108/50.13 |
| 1,466,191 A * | 8/1923 | Roos | 108/95 |
| 1,599,616 A * | 9/1926 | Hamburger | 248/125.3 |
| 1,824,682 A | 9/1930 | O'Neil | |
| 2,696,963 A * | 12/1954 | Shepherd | 248/229.15 |
| 4,779,540 A * | 10/1988 | Dion et al. | 108/98 |
| 5,297,305 A | 3/1994 | Williams | |
| 5,353,716 A | 10/1994 | Wilbert | |
| 5,906,284 A * | 5/1999 | Hammerstrom et al. | 211/205 |
| 5,979,844 A | 11/1999 | Hopkins | |
| 6,269,503 B1 | 8/2001 | Betker | |
| 6,497,441 B1 | 12/2002 | Mahmood et al. | |
| 6,964,595 B2 | 11/2005 | Libretti | |
| 7,178,765 B2 * | 2/2007 | Huang | 248/122.1 |
| 7,717,382 B2 * | 5/2010 | Whittemore et al. | 248/230.4 |
| 2002/0011544 A1 * | 1/2002 | Bosson | 248/121 |
| 2002/0179783 A1 * | 12/2002 | Kim | 248/122.1 |
| 2006/0202091 A1 * | 9/2006 | Oddsen et al. | 248/122.1 |
| 2007/0034753 A1 * | 2/2007 | Lee | 248/121 |
| 2012/0132763 A1 * | 5/2012 | Robinson | 248/103 |

* cited by examiner

*Primary Examiner* — Bradley Duckworth
(74) *Attorney, Agent, or Firm* — Mark R. Malek, Esq.; G. Philip J. Zies, Esq.; Zies Widerman & Malek (57) ABSTRACT

A multi-functional infant care and organizer system includes a base member and an elongate main body member detachably connected to and extending upwardly from the base member. The system also includes unit carrying member that is moveably connected to the main body member and unit member slidably and rotatably connected to the main body member and supported by the unit carrying member when slidably connected to the main body member. The unit member can be a storage unit, a changing station, a table, a light, a hanger, a bath pod, entertainment unit, an infant hammock, an infant mobile, a music box, or a drawing surface. Any combination of unit members may be connected to the main body member.

25 Claims, 10 Drawing Sheets

MULTI-FUNCTIONAL INFANT CARE AND ORGANIZER SYSTEM AND ASSOCIATED METHODS

FIELD OF THE INVENTION

The present invention relates to the field of organizer systems and, more specifically, to the field of organizer systems for infant care and associated methods.

BACKGROUND OF THE INVENTION

Caregivers of infants often use changing stations to change diapers of the infants. Many of these can be ergonomically designed so that the caregiver does not have to bend over too much while changing the infant. Similarly, many tables have been provided that can be adjusted in height so that a caregiver can readily bath an infant while in a comfortable position. Many changing stations can be customized for the convenience of the caregiver. For example, changing stations can be customized with a variety of accessories. These types of changing stations, however, may be limited in versatility and can truly only be used for one purpose—a baby changing station. After the infant has grown, the caregiver may be stuck with an expensive piece of furniture that does not have another value.

Most infant changing stations are made to sit at waist height to eliminate the need for the caregiver to bend or kneel while changing the diaper of the infant. Very few changing stations allow for height adjustment. Accordingly, options may be limited for caregivers that do not fit into the average height for which most changing stations are designed. In addition, changing stations that do have height adjustment capabilities may be unsteady with very little, if any, capabilities to fix accessories thereto, i.e., baby entertainment units, etc. There have been some changing stations that incorporate a baby bath, along with additional storage. These units, however, can be quite bulky. Arranging such a station to fit into one room can prove to be quite difficult.

One type of infant care center is disclosed in U.S. Pat. No. 6,964,595 to Libretti. The Libretti '595 patent discloses a child infant care play center including a table having a recessed bathtub in a changing table/bed that is movably disposed over the top. The table included flexible conduit having a faucet attached at one end that is extractable from and retractable into a divider that is used to demarcate the various areas on the infant care center. The system also includes a mobile mounted over the infant care area that may be actuated to rotate with an accompanying melody. A baby monitor is included and may be fixed to the upper surface of the table. A free-standing booster chair is also included that converts to a training toilet, and can be movably supported on an edge portion of the table. The system disclosed in the Libretti '595 patent, however, is somewhat bulky, and will not have use after the infant has been potty trained, and is able to take a bath in a typical bathtub.

U.S. Pat. No. 6,497,441 to Mahmood et al. discloses a multi-purpose console for use in a vehicle having an armrest. The console is adapted to be used as an infant changing station that includes storage compartments, and an electronic entertainment device. The device disclosed in the Mahmood et al. '441 patent, however, is primarily designed for use in vehicles, and would have little purpose as a primary infant care station. Other multi-purpose diaper changing stations are also known. For example, U.S. Pat. No. 6,269,503 to Betker discloses a diaper changing station that incorporates voice and/or voice instructions in any variety of languages that is activated by a motion detector, manual depression of a button, or by lowering a changing platform into a position of use.

There exists a need for a multi-functional infant care and organizer system that can be readily used for several different purposes.

SUMMARY OF THE INVENTION

With the above in mind it is therefore an object of the present invention to provide a multi-functional infant care and organizer system that is stable and can be height adjusted. It is also an object of the present invention to provide a multi-functional infant care and organizer system that includes multiple infant care stations, each of which may be height adjustable, and that is stable. It is further an advantage of the present invention to provide a system that includes several different infant care accessories to allow the user to customize the infant care system as needed. It is yet another advantage of the present invention to provide an infant care and organizer system that includes entertainment and educational accessories to be used by the caregiver for the benefit of the infant while also simultaneously providing ample storage space for infant care supplies.

The system according to the present invention is also advantageously compact and ergonomically fits within any type of room. The system also advantageously provides accessories that can be rotated 360° to the user's liking. The system further advantageously allows for customization by the user by allowing any number of infant care giving units to be combined in any manner desired by the user. The system also advantageously provides enhanced storage while simultaneously requiring less space than traditional storage systems.

The multi-functional infant care and organizing system according to the present invention still further advantageously provides enhanced longevity as it can be readily transformed to suit many other needs, such as, for example, a desk, an art easel, a chalkboard, a dry erase board, etc. The system also advantageously takes the place of several pieces of traditional furniture and equipment that may be necessary for providing care to an infant. The individual units of system according to the present invention can advantageously be readily removed from the main body so as to allow for cleaning as necessary. The system according to the present invention further advantageously places many items necessary to provide care to an infant in one place, thereby decreasing the need to carry an infant between several different areas to provide care.

The system according to the present invention also advantageously allows a user to provide entertainment to an infant while simultaneously providing care to the infant. The system according to the present invention further advantageously provides enhanced stability through use of a weighted base system.

These and other objects, features and advantages according to the present invention are provided by a multi-functional infant care and organizer system comprising a base member, an elongate main body member detachably connected to and extending upwardly from the base member and a unit carrying member that is moveably connected to the main body member. The system also includes a unit member that is slidably and rotatably connected to the main body member and supported by the unit carrying member when slidably connected to the main body member.

The base member may include a lower base member and an upper base member connected to and adapted to overlie the lower base member. The upper base member may include an opening and may be adapted to receive a weighted material. This advantageously provides stability to the system by providing a weighted anchor that maintains the system in place during use. The main body member may include an upper main body member and a lower main body member threadably connected to one another. The lower main body member may be threadably connected to the base member. Each of the upper and lower main body members may be substantially tubular.

The main body member may include a plurality of spaced apart grooves formed on an outer surface portion thereof. Each of the plurality of spaced apart grooves may be aligned substantially parallel with one another and may extend substantially about the circumference of the main body member. The unit carrying member may engage at least one of the grooves. Each of the grooves may represent a different height that the unit carrying member can be positioned at. The unit carrying member may include a height fixing member that engages a portion of the main body member to fix the height position of the unit carrying member with respect to the main body member.

The unit carrying member may include a rotation stopping member that engages a portion of the main body member to fix the orientation of the unit carrying member with respect to the main body member. Both the fixing member and the rotation stopping member may include a pin member that moveably extends outwardly from an inner peripheral portion of the unit carrying member between an engaged position and a disengaged position. The engaged position may be defined by the pin member being in contact with a portion of the main body. The disengaged position may be defined by the pin member being spaced apart from the main body so that the unit carrying member is moveable along and about the main body member.

The unit member may be a storage unit, a changing station, a table, a light, a hanger, a bath pod, entertainment unit, an infant hammock, an infant mobile, a music box, or a drawing surface. Any combination of units can advantageously be selectively detachably connected to the main body member.

A method aspect of the present invention is for using a multi-functional infant care and organizer system. The method may include detachably connecting the elongate main body member to the base member. The method may also include detachably connecting the unit carrying member to the main body member so that the unit carrying member is movably connected to the unit carrying member. The method may further include slidably connecting the unit member to the main body member so that the unit member is supported by the unit carrying member when slidably connected to the main body member.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring to FIGS. 1-19, a multi-functional infant care and organizer system 20 (hereinafter referred to as "the system") according to the present invention is now described in greater detail. The system 20 according to the present invention may advantageously have several different configurations in order to provide a user with customization capabilities. As illustrated, for example, in FIGS. 1-3 and 18-19, the system 20 according to the present invention may advantageously include various components for various purposes. The system 20 illustrated in FIG. 1 may be configured for use as a baby changing station, while the system illustrated in FIG. 2 may be configured for use as a baby bathing station. The system illustrated in FIG. 3 may be configured as a children's play area. After the infant has outgrown the infant care giving capabilities of the system 20, the system may be configured for alternate uses as illustrated, for example, in FIGS. 18-19. The system 20 illustrated in FIG. 18 may be configured to provide enhanced storage space and hangers for a user, as will be discussed in greater detail below. The system 20 illustrated in FIG. 19 may be configured to provide desk space to a user and lighting in the form of a lamp, as will also be discussed in greater detail below.

Referring now more specifically to FIGS. 4-9, additional features of the system 20 according to the present invention are now described in greater detail. The system 20 may include a base member 22. As illustrated, for example, in FIGS. 4 and 5, the base member 22 may include a lower base member 24 and an upper base member 26. The upper base member 26 may be connected to and adapted to overlie the lower base member 24. More specifically, and referring with specificity to FIG. 4, the lower base member 24 may have an outer peripheral portion with an arcuate shape. It should be noted that those skilled in the art will appreciate that the lower base member 24 need not have the same outer peripheral portion of the upper base member 26, but can be larger. This advantageously enhances the overall stability of the system 20. When, for instance, the lower base member 24 is enlarged to such extent that the caregiver may be required to stand on the lower base member, the caregiver's weight may add additional weight in securing the system. The lower base member 24 may be covered with a durable rubber or non-slip surface. A stem member 30 may be connected to and extend upwardly from a medial portion of the lower base member 24. The stem member 30 may be adapted to engage a lower portion of the upper base member 26. The stem member 30 may be substantially cylindrical and may have an interior portion that is threaded.

Figure 5:
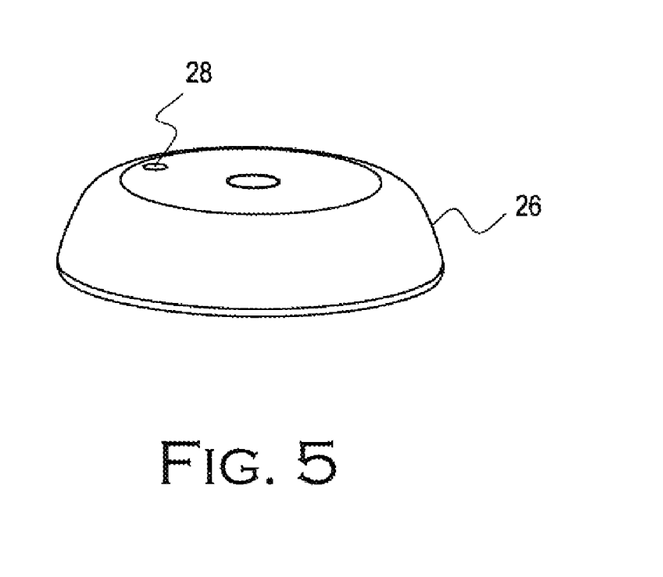
FIG. 5 is a perspective view of an upper base member of the system illustrated in FIG. 1.

A lower portion of the upper base member 26 may include a passageway formed therein to receive the stem member 30 of the lower base member 24. The passageway may also be cylindrical so that the stem member 30 may pass substantially therethrough. As will be discussed in greater detail below, the stem member 30 may be adapted to receive additional portions of the system 20. The upper base member 26 may be positioned to overlie the lower base member 24, and may have a shape that is substantially similar to the lower base member. More specifically, the outer peripheral portion of the upper base member 26 may also have an arcuate shape that is substantially similar to that of the lower base member 24.

An opening 28 may be formed in an upper portion of the upper base member 26. The upper base member 26 may be substantially hollow and adapted to receive a weighted material. The weighted material may be placed within the upper base member 26 through the opening 28 formed in an upper portion of the upper base member. The weighted material may, for example, be sand, water, or any other common weighted material that is preferably non-toxic, and that may be used to advantageously enhance stability of the system 20 according to the present invention. The interior portion of the upper base member 26 is preferably large enough to receive a substantial amount of weighted material to provide enhanced stability. For example, if the weighted material to be positioned with the upper base member 26 is water, then it is preferable that the upper base member have an interior volume to accommodate over 20 gallons of water to provide a weight of at least 150 pounds. Those skilled in the art will appreciate, however, that this is meant for exemplary purposes, and is not meant to be limiting. Accordingly, the base member 22 advantageously anchors the system 20 to provide enhanced stability thereto, with the lower base member 24 providing support for connection of portions of the system (as will be discussed in greater detail below) and the upper base member 26 providing anchoring weight to stabilize the system.

Figure 4:
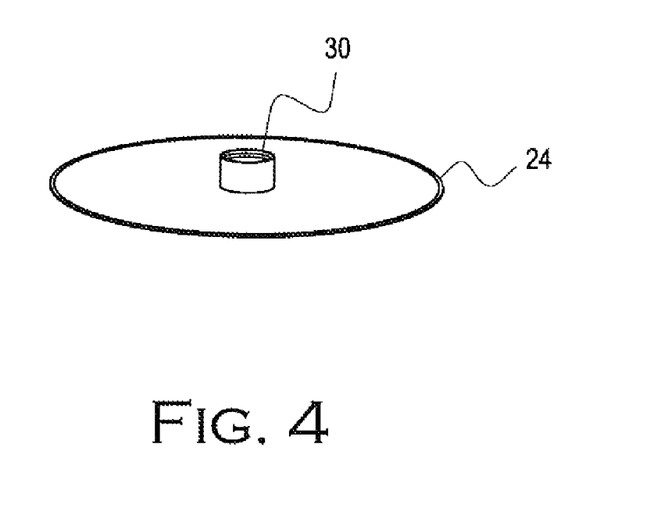
FIG. 4 is a perspective view of a lower base member of the system illustrated in FIG. 1.

The lower base member 24 is preferably provided by steel material. The upper base member 26, which is adapted to overlie the lower base member 24, may include a recessed portion that overlies the lower base member so that the outer peripheral portion of the lower base member is positioned interior to the outer peripheral portion of the upper base member 26. The upper base member 26 is preferably provided by high density polypropylene material. This material preferably has high gloss properties, which advantageously allows for various designs or other indicia to be printed on the outer peripheral portion thereof.

Figure 6:
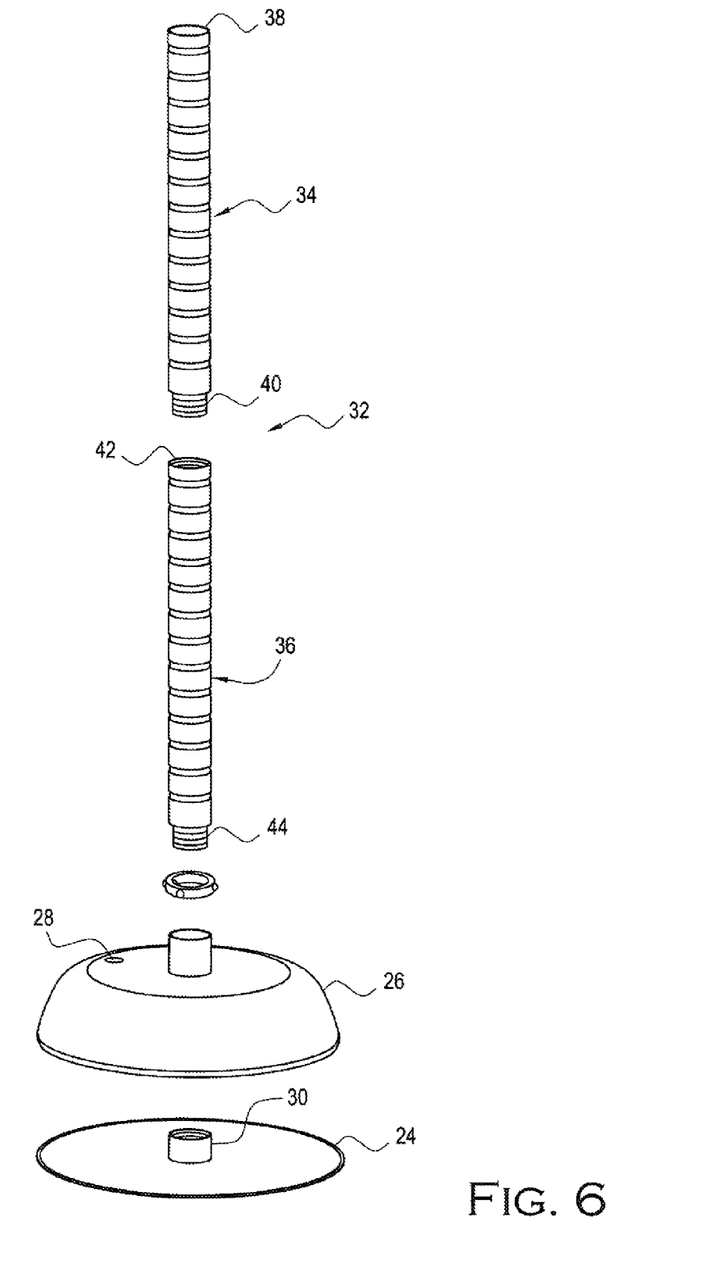
FIG. 6 is an exploded perspective view of an elongate main body member, and a base member of the system illustrated in FIG. 1.

Referring now additionally to FIG. 6, additional features of the system 20 according to the present invention are now described in greater detail. The system 20 includes an elongate main body member 32 that may be detachably connected to and extend upwardly from the base member 22. More specifically, the elongate main body member 32 may be threadably connected to the lower base member 24, and extend upwardly through the upper base member 26. The elongate main body member 32 preferably includes an upper main body member 34 and a lower main body member 36. The upper main body member 34 includes an upper portion 38 and a lower portion 40 positioned opposite the upper portion. Similarly, the lower main body member 36 includes an upper portion 42 and a lower portion 44 positioned opposite the lower portion.

The upper and lower main body members 34, 36 are illustratively adapted to be threadably connected to one another. More specifically, the lower portion 40 of the upper main body member 34 may be threadably connected to the upper portion 42 of the lower main body member 36. The lower portion 44 of the lower main body member 36 may be threadably connected with the stem member 30 of the lower base member 34. The illustrated system shows the threaded connection between the upper main body member 34 and the lower main body member 36 as having a male connection on the lower portion 40 of the upper main body member 34 and a female connection on the upper portion 42 of the lower main body member 36. Those skilled in the art will appreciate, however, that the threaded connection between the upper and lower main body members 34, 36 may be configured in any other way, and that the connection between the upper and lower main body members is not limited to a threaded connection, but that any other type of connection may be used as well.

In operation, the elongate main body member 34 may pass through the medial portion of the upper base member 26 and threadably engage the stem member 30 of the lower base member 24. Those skilled in the art will appreciate that the main body member 32 need not function on the basis of having grooves but instead can have punched holes on the opposite sides of each other thus allowing the height fixing members 54 to penetrate the holes formed therein. Those skilled in the art will appreciate that although the elongate main body member 32 is illustrated as having an upper main body member 34 and a lower main body member 36, the system 20 according to the present invention is not limited to two main body members that may be connected to one another, but rather may advantageously utilize any number of main body members to carry out the features, advantages, and benefits according to the present invention. The elongate main body member 32 is preferably tubular in shape, but those skilled in the art will appreciate that any shaped elongate body member may be used to achieve the advantages, features and benefits of the present invention. The elongate main body member 32 is preferably provided by aluminum material, but any similar material providing similar strength, properties and weight properties, is understood by those skilled in the art, may also be used.

Referring additionally to FIGS. 7-7A, and FIGS. 8-9, additional features of the system 20 according to the present invention are now described. The system 20 illustratively includes a unit carrying member 46 that may be detachably and movably connected to the main body member 32. The unit carrying member 46 preferably has a cylindrical shape that is adapted to slidably engage the main body member 32. An interior peripheral portion of the unit carrying member 46 preferably has a radius that is slightly larger than an exterior peripheral portion of the main body member 32. As perhaps best illustrated in FIG. 9, the unit carrying member 46 is adapted to be vertically and rotatably fixed at a certain position along the main body member 32 to support a unit member 48 and to prevent the unit member from rotating about the main body member. The unit member 48 slidably and rotatably connects to the main body member 32 and is supported by the unit carrying member 46 when slidably connected to the main body member. Those skilled in the art will appreciate that the unit carrying member 46 may structurally differ in size, thereby allowing each unit member 48 to be detachably connected to the unit carrying member instead of being supported by it, i.e. a unit member that is provided by a drawing surface may detachably connect with a unit carrying member without having to slidably engage the main body member. Those skilled in the art will further appreciate that unit member 48 which are not evenly balanced around the main body member 32, i.e. the bath pod and changing table, may be counterweighted either in the unit member itself, or with a structurally altered unit carrying member 46. This advantageously provides enhanced stability to multiple configurations of the system 20 according to the present invention.

Figure 8:
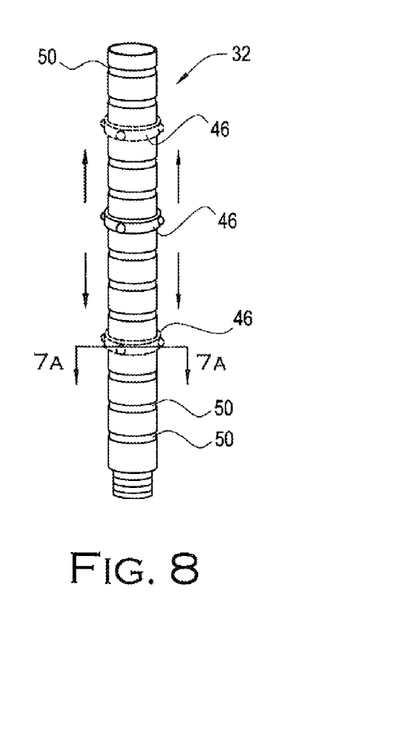
FIG. 8 is a perspective view of the unit carrying member illustrated in FIG. 7 engaging the elongate main body member.
Figure 9:
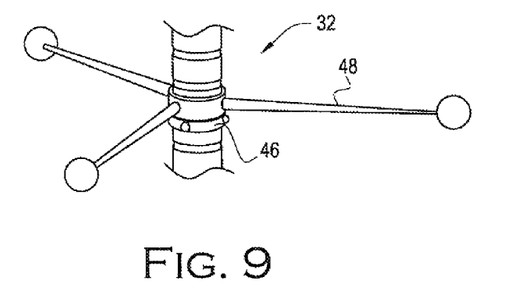
FIG. 9 is a partial perspective view of a unit member connected to the main body member and supported by the unit carrying member illustrated in FIG. 7.

As illustrated, for example, in FIG. 8, the main body member 32 includes a plurality of grooves 50 formed therein. The plurality of grooves 50, each preferably extend about the circumference of the main body member 32. Further, the plurality of grooves 50 are spaced apart along an outer surface portion of the main body member 32 and are aligned substantially parallel with one another. The unit carrying member 46 is adapted to engage the main body member 32 adjacent one of the plurality of grooves 50. Accordingly, the unit carrying member 46 may be adjusted in height along the main body member 32 by engaging one of the plurality of grooves 50, as illustrated, for example, in FIG. 8. Therefore, the unit carrying member 46 may be vertically moved along the main body member 32, and fixed in a desired vertical position by engaging one of the plurality of grooves 50 formed in the main body member. Accordingly, each of the unit members 48 supported by the unit carrying member 46 may be vertically adjusted to a desired height with respect to the main body member 32 to advantageously provide the user with several different options for customization. Those skilled in the art will appreciate that a unit carrying member 46 and unit member 48 need not be configured as two separate members but can also be structurally formed to be one member 46.

Figure 7:
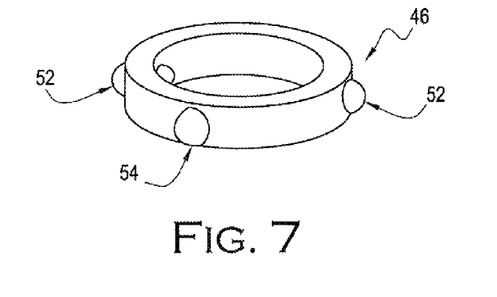
FIG. 7 is a perspective view of a unit carrying member of the multi-functional infant care and organizer system according to the present invention.
Figure 7A:
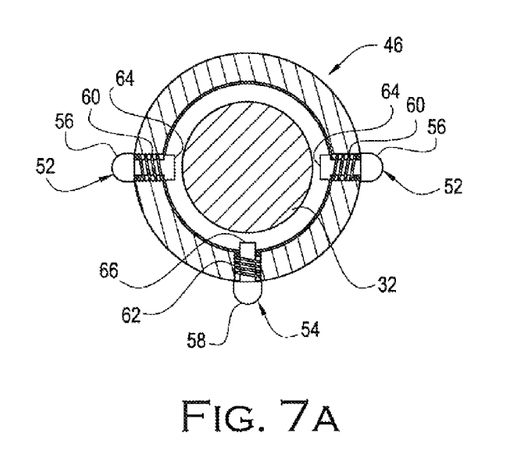
FIG. 7A is a cross sectional view of a portion of the multi-functional infant care and organizer system taken through line 7A-7A in FIG. 8.

Referring now back to FIGS. 7 and 7A, features of the unit carrying member 46 will be described in more detail. The unit carrying member 46 includes height fixing members 52 and a rotation stopping member 54. The rotation stopping member 54 and the height fixing members 52 are illustratively provided by respective spring loaded buttons 58, 56 that protrude outwardly from the outer peripheral portion of the unit carrying member 46. Each of the respective spring loaded buttons 58, 56 engage respective pins 66, 64 that are carried by passageways formed through the body of the unit carrying member 46. The rotation stopping member 54 may engage a portion of the main body member 32 to fix the orientation of the unit carrying member 46 with respect to the main body member. More specifically, the rotation stopping members 54 may be moved between a disengaged position, allowing the unit carrying member 46 to be rotatably moved with respect to the main body member 32, and an engaged position, wherein the unit carrying member is rotatably fixed with respect to the main body member. When in the engaged position, pin 66 of the rotation stopping member 54 engage one of the grooves 50 of the main body member 32 to stop rotation of the unit carrying member 46, thereby stopping rotation of the unit member 48 supported by the unit carrying member. When in the disengaged position, pin 66 associated with the rotation stopping members 54 are spaced apart from any portion of the main body member 32 so that the unit carrying member 46 may be freely rotated about the main body member, to thereby allow the unit member 48 supported by the unit carrying member to be rotated about the main body member.

Similarly, the height fixing members 52 may engage a portion of the main body member 32 to fix the vertical height of the unit carrying member 46 with respect to the main body member. More specifically, the height fixing members 52 may be moved between a disengaged position, allowing the unit carrying member 46 to be vertically moved with respect to the main body member 32, and an engaged position, wherein the unit carrying member is vertically fixed with respect to the main body member. When in the engaged position, pins 64 of the height fixing members 52 engages one of the grooves 50 of the main body member 32 to vertically fix the unit carrying member 46, thereby vertically fixing the unit member 48 supported by the unit carrying member. When in the disengaged position, pins 64 associated with the height fixing member 52 may be spaced apart from any portion of the main body member 32 so that the unit carrying member 46 may be freely vertically moved with respect to the main body member, to thereby allow the unit member 48 supported by the unit carrying member to be vertically moved with respect to the main body member.

Although the unit carrying member 46 of the system 20 of the present invention is illustrated as including a single rotation stopping member 54, and a pair of opposing height fixing member 52, those skilled in the art will appreciate that the unit carrying member may be provided with any number of height fixing members 52 and rotation stopping members 54. Further, the orientation of the height fixing members 52 and the rotation stopping member 54 may be provided by any configuration, and the illustrated configuration is not meant to be limiting, but is, instead, exemplary in nature. The button 58 of the rotation stopping member 54 and the buttons 56 of the height fixing members 54 may be color coded. More specifically, and for the exemplary purposes only, the rotation stopping member 54 may include a red-colored button 58 protruding outwardly from the unit carrying member 46, indicating a color associated with stopping motion, or rotation, i.e., red. Similarly, the height fixing member 52 may, for example, have green-colored buttons 56 associated therewith which may be a color associated by the user with motion, i.e., vertically moving the unit carrying member 46 by depressing the buttons 56 associated with the height fixing member 52. Those skilled in the art will appreciate that the buttons 58, 56 associated with the rotation stopping members 54 and the height fixing member 52 need not be color coded, and can be provided with any color.

The pin member 66 associated with the rotation stopping member 54, and the pin members 64 associated with the height fixing members 52 are preferably provided by steel pins, and may include a rubber padded material adjacent an end portion thereof. It is preferable to use the rubber padded material for the pin member 66 associated with the rotation stopping members 54, but those skilled in the art will appreciate that the rubber padded material may also be included on the pin 64 associated with the height fixing member 52.

The respective spring members 62, 60 advantageously allow for each of the rotation stopping member 54 and height fixing members 52 to be readily depressed by the user to minimize the effort required to move the respective pins 66, 64 associated with the rotation stopping members and the height fixing member between the engaged position and the disengaged position. It is preferable, however, that the spring members 60, 62 associated with the respective rotation stopping member 54 and the height fixing members 52 provide adequate stiffness to prevent a child, or infant, from accidently depressing the rotation stopping member or the height fixing members and moving the unit carrying member 46, thereby allowing for either rotational or vertical motion of the unit member 48 supported by the unit carrying member.

The configuration of the rotation stopping member 54 and the height fixing members 52 advantageously allow each of the unit carrying members 46 to be moved vertically along the main body member 32 independent of one another, and circumferentially about the main body member independent of one another. The illustrated configuration of the height fixing members 52, i.e., opposing one another, is also advantageous as it is less likely that smaller hands associated with an infant or child will be able to grasp both buttons 56 to cause vertical movement of the unit carrying member 46. A similar configuration is contemplated for the rotation stopping member 54 in order to also decrease the possibility of an infant or child from readily rotating the unit carrying member 46, thereby causing movement of the unit member 48.

Figure 10:
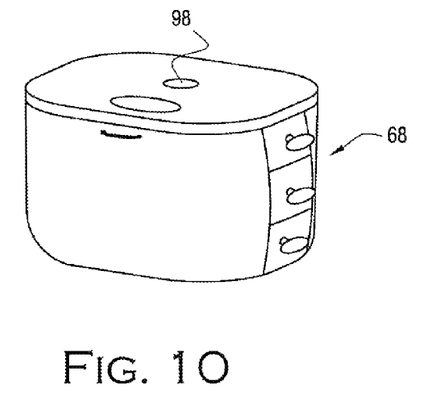
FIGS. 10-17 are perspective views of various units adapted to engage the elongate main body member of the multi-functional infant care and organizer system according to the present invention.
Figure 11:
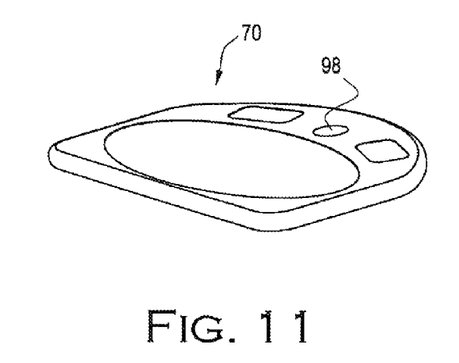

As illustrated in the embodiment of the system 20 shown in FIGS. 1-3, and FIGS. 18-19, several different unit members 48 may be connected to the main body member 32 and supported by the unit carrying member 46 to advantageously provide the user with several different configurations. As illustrated in FIG. 10, one of the unit members 48 may be a storage unit. This type of storage unit may advantageously be used to store diapers or wipes when the system 20 is used as a baby-changing station as illustrated, for example, in FIG. 1. As the infant becomes older and is potty trained, the need for diaper changing becomes obsolete, and the storage unit 68 illustrated in FIG. 10 may be used for other purposes, i.e., it may take the place of the drawers of a dresser, or for any other type of storage, as desired by the user.

Figure 12:
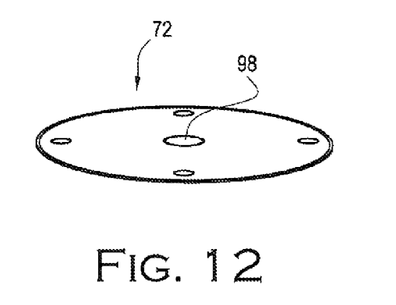
Figure 13:
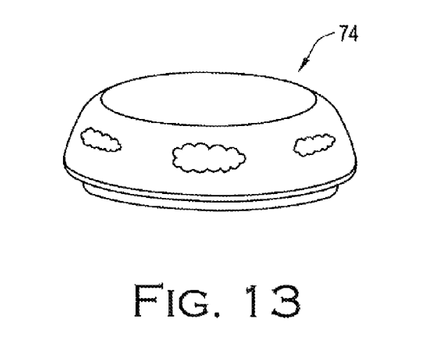
Figure 14:
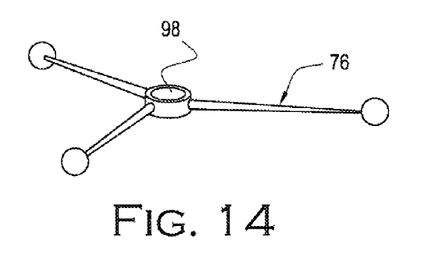
Figure 15:
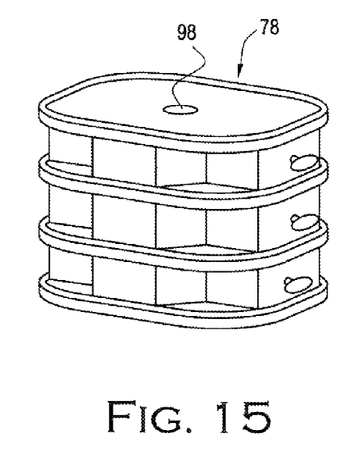
Figure 16:
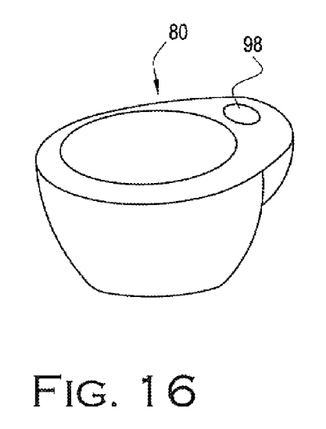
Figure 17:
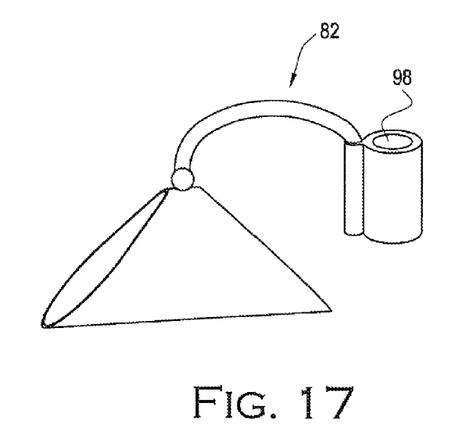

Other unit members 48 are illustrated in FIGS. 11-17. More specifically, in FIG. 11, the unit member 48 may be provided by a changing tray 70 that may be adapted to engage the main body member 32. A spin table 72 is illustrated in FIG. 12, and a light 74 is illustrated in FIG. 13. A hanger 76 is illustrated in FIG. 14, and an alternate storage unit 78 having a configuration different than the storage unit 68 illustrated in FIG. 10 is shown in FIG. 15. A bathing unit 80, or bath pod, is illustrated in FIG. 16, and a baby hammock 82, or baby swing, is illustrated in FIG. 17. One common feature of most of the unit members 48 is a passageway 98 formed through some body portion thereof. The passageway 98 preferably has a substantially cylindrical shape, and is adapted to slidably engage the main body member 32 so that each of the unit members 48 may be slidably moved, both vertically and rotationally, about the main body member. The light 74 illustrated in FIG. 13 is adapted to engage an upper portion of the main body member 32 and, therefore, does not include a passageway therethrough. Instead, it is preferred that the light 74 is fixed to an upper portion of the main body member 32 to provide illumination to lower portions of the system 20. Those skilled in the art will appreciate, after having had the benefit of reading this disclosure, that the light 74 illustrated in FIG. 13 may be threadably connected to a portion of the main body member 32, or may be connected in any other way that provides for the light to be fixed to some portion of the main body member.

Figure 1:
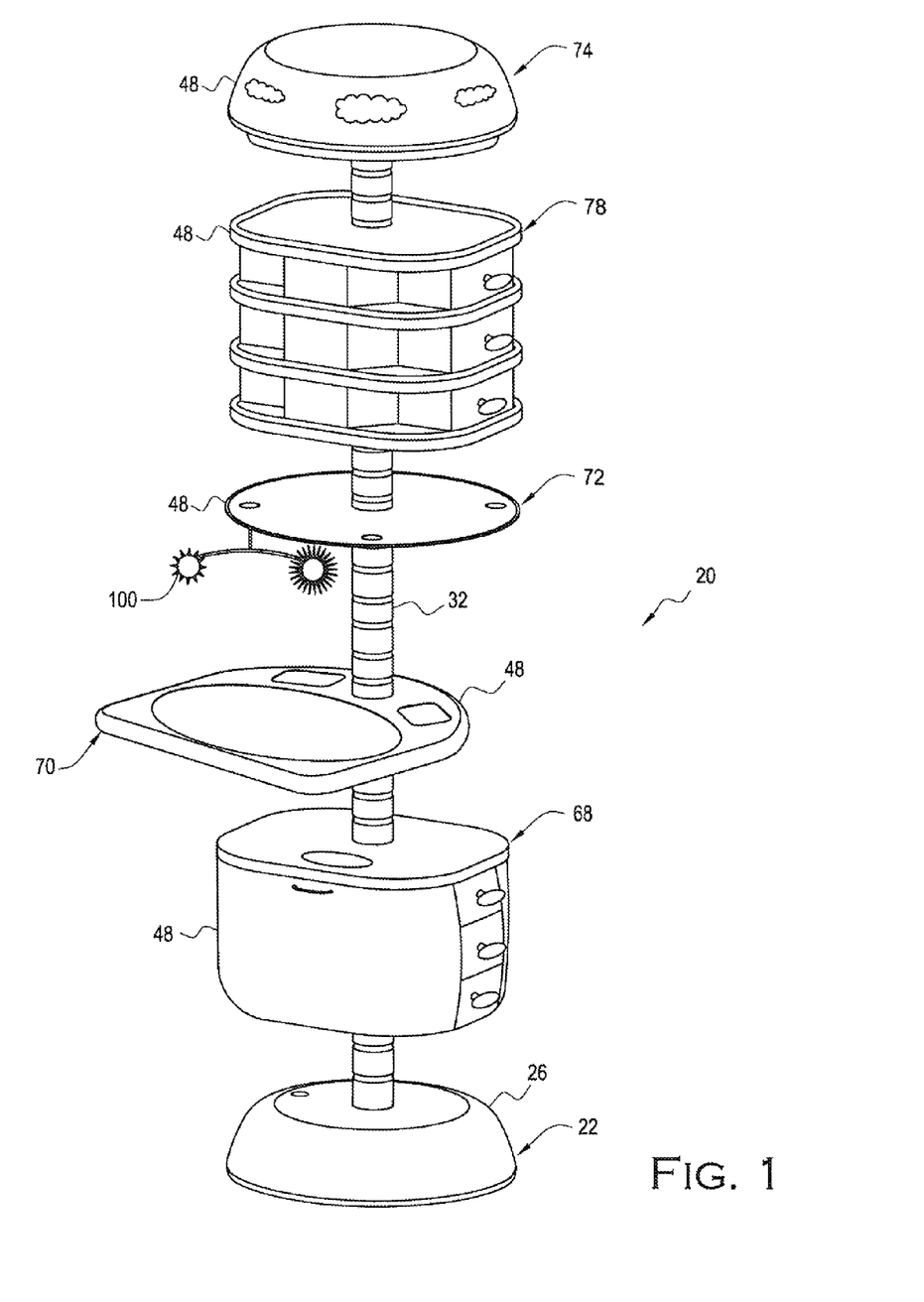
FIG. 1 is a perspective view of a multi-functional infant care and organizer system according to the present invention.

Referring now back to FIG. 1, a configuration of the system 20 that is adapted to be used as a baby-changing station is now described in greater detail. The system 20 illustrated in FIG. 1 includes the base member 22, a main body member 32 connected to the base member and extending upwardly therefrom and a plurality of units 48 slidably connected to the main body member. The particular units included in the system 20 illustrated in FIG. 1 include a storage unit 68, a changing tray 70, a spin table 72, an additional storage unit 78, and a light 74. The storage unit 68 illustrated towards the bottom portion of the system 20 in FIG. 1 may be used, for example, to store diapers for the infant. The changing tray 70 may be conveniently positioned just above the storage unit 68 so that a caregiver changing a baby positioned on the changing table may readily access changing supplies located in the storage unit 68. The spin table 72 is immediately positioned just above the changing table 70, and includes a baby toy 100 that is connected thereto. The baby toy 100 may, for example, be similar to a mobile, or some other type of baby toy that can keep an infant entertained (or distracted) while the caregiver is changing the infant's diaper. This configuration advantageously allows the infant to readily play with the baby toy 100 hanging from a bottom portion of the table 72. The spin table 72 may be adopted to freely rotate about the main body member 32 to allow the infant positioned on the changing table 70 to play with and rotate the baby toy 100.

Another storage unit 78 may be conveniently positioned above the spin table 72 to provide additional storage space for supplies, and also conveniently positioned within reach of the caregiver so that the caregiver need not leave an infant positioned on the changing table 70 to access additional supplies. The light 74 is preferably fixed to an upper portion of the main body member 32 to provide illumination therebeneath while providing care to the infant. Those skilled in the art will appreciate that the system 20 according to the present invention may include a power source to provide power to the light 74, or any other unit member 48 that may require power. Alternately, the system 20 according to the present invention may include the capability to connect to an external power source to provide power to the light 74 or to any other unit member 48 connected to the main body member 32. It is contemplated that the power source may be distributed throughout the system 20 by providing power outlets, for example, along the main body member 32 so that power may be provided to any unit member 48 positioned anywhere along the main body member. This advantageously provides enhanced flexibility for the user to readily customize the system 20.

Each of the unit members 48 illustrated in FIG. 1 is supported by a unit carrying member 46 that is connected to the main body member 32. Further, each of the unit members 48 illustrated in FIG. 1 may be readily vertically moved along the elongate main body member 32 using the height fixing members 52. Similarly, each of the unit members 48 may be readily rotated about the main body member 32 using the rotation stopping member 54. Those skilled in the art will appreciate that the layout of the system 20 illustrated in FIG. 1 is exemplary in nature, and is not meant to be limiting. Instead, the layout of the unit members 48 illustrated in FIG. 1 may be readily customized by a user by simply changing the order in which the unit members 48 engage the elongate main body member 32. Further, the system illustrated in FIG. 1 is not limited to the illustrated unit members 48, but any number of unit members may be connected to the main body member to provide several different unique configurations of the system 20. As will be discussed in greater detail below, the system 20 according to the present invention may be readily configured using several different unit members 48 and positioned to engage the main body member 32 in any order to provide a system that may be used for several different functions.

Figure 2:
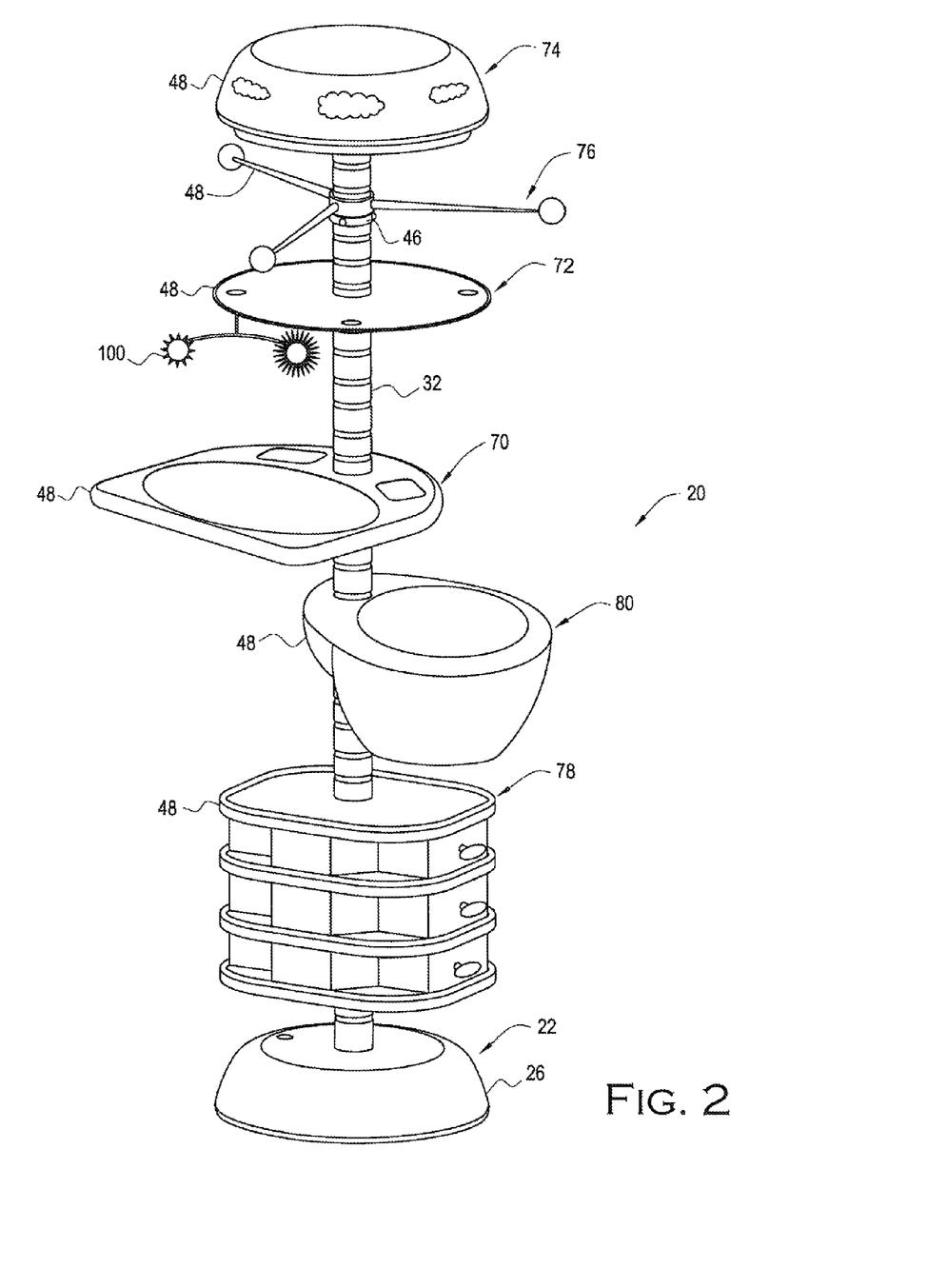
FIG. 2 is another perspective view of the system illustrated in FIG. 1.

Referring now additionally to FIG. 2, yet another configuration of the system 20 according to the present invention is now described in greater detail. This configuration of the system 20 is preferably used as an infant bath station. The infant bath station may include a plurality of units 48 that engage the elongate main body member 32 to provide a configuration suitable for bathing an infant. More specifically, the units 48 may include a storage unit 78, an infant bath pod 80, an infant changing table 70, a spin table 72 having an infant toy 100 connected thereto, a hanger 76, and a light 74. The infant bath pod 80 includes an interior portion within which the infant may be bathed. Conveniently located above the bath pod 80 is the changing table 70, which is also advantageously within reach of the storage unit 78 so that the caregiver need not move away from the infant to access items that may be stored in the storage unit 78. Those skilled in the art will appreciate that, similar to the configuration of the system 20 illustrated in FIG. 1, the system illustrated in FIG. 2 may be customized to include any layout of the unit members 48 so that the system may have several different functions. For example, the storage unit 78 illustrated in FIG. 2 may not be desirous to a user, and instead, the user may prefer to use a storage unit 68 as illustrated in FIG. 1. The system 20 according to the present invention advantageously allows for the user to customize any configuration by including any number of units 48 connected to the main body member 32.

Figure 3:
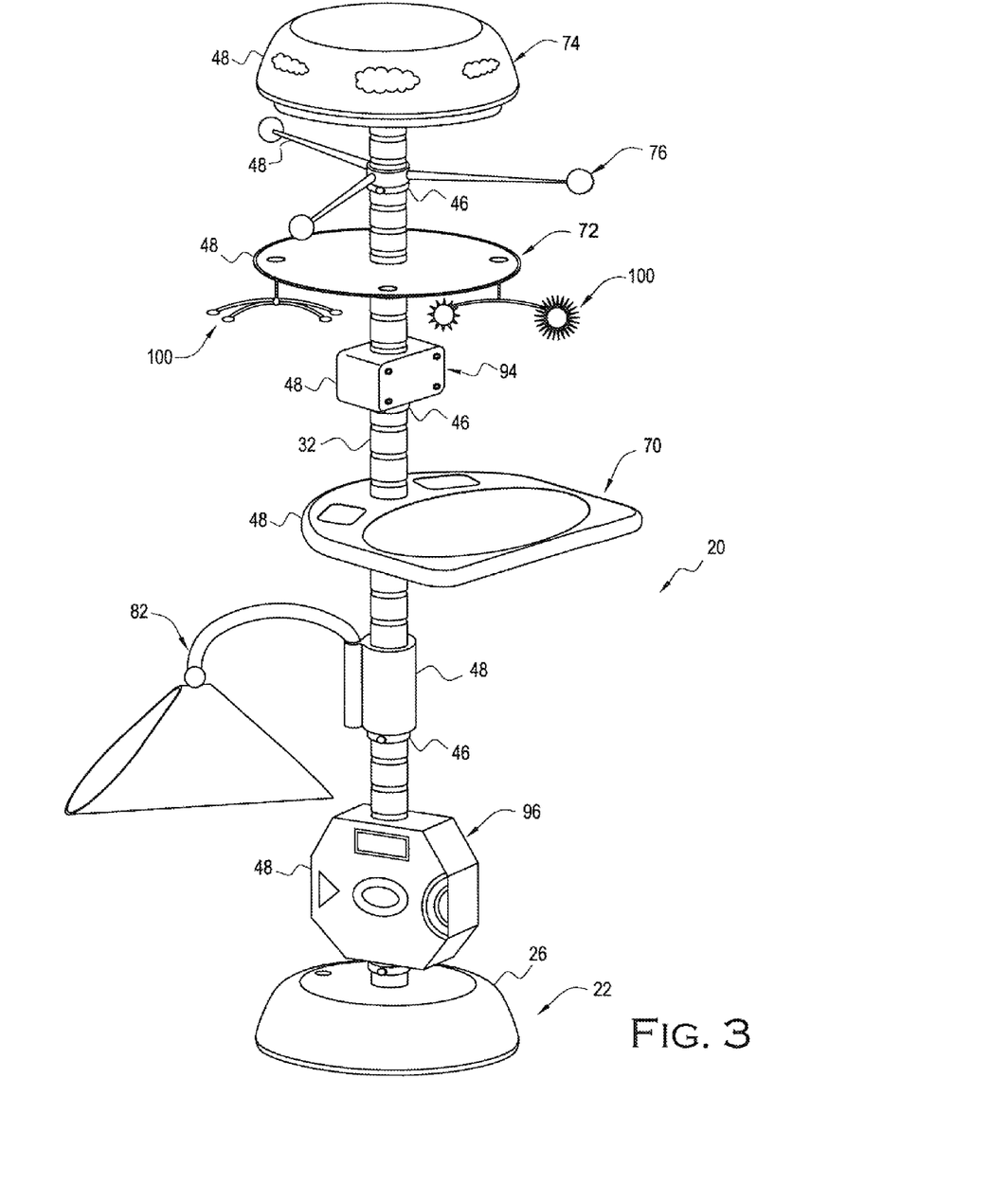
FIG. 3 is yet another perspective view of the system illustrated in FIG. 1.

Referring now additionally to FIG. 3, yet another configuration of the system 20 according to the present invention is now described in greater detail. The configuration of the system 20 illustrated in FIG. 3 is designed to be used as an infant play area. Similar to the configurations of the system 20 illustrated in FIGS. 1 and 2, the configuration of the system illustrated in FIG. 3 includes a plurality of unit members 48 that may be connected to the main body member 32. Each of the plurality of unit members 48 are supported by a unit carrying member 46 that advantageously allows each of the plurality of unit members to be vertically adjusted along the main body member 32, and rotatably moved around the main body member. The system 20 illustrated in FIG. 3 includes a light 74 connected to a top portion of the elongate main body member 32, a hanger 76 positioned below the light, a spin table 72 having a plurality of baby toys 100 connected thereto, and a music box 94 also connected to the main body member 32. The music box 94 advantageously provides entertainment to an infant that may be supported on the changing table 70. The music box 94 may, for example, be provided by an MP3 player that may be adapted to play media from external storage, i.e., a thumb drive or other storage media, or that may include an internal memory capable of having media stored thereon. The music box 94 may have an internal power source or may, for example, be adapted to connect to a power supply along the main body member 32, as discussed in greater detail above.

The system 20 illustrated in FIG. 3 also includes a baby hammock 82, or baby swing, that may be used to allow an infant to swing while being entertained by the baby toys 100 and a music box 94. The system 20 illustrated in FIG. 3 also includes a play station 96 connected to a bottom portion of the main body member 32 so that an infant playing on the floor adjacent the system may have ready access thereto. As was the case with the system illustrated in FIGS. 1 and 2, the unit members 48 connected to the main body member 32 illustrated in FIG. 3 may be configured in any order, and any type of unit member 48 may be connected to the main body member to advantageously allow the user to readily customize the system as necessary. Again, the configuration of the system illustrated in FIG. 3 is exemplary in nature, and not meant to be limiting.

Figure 18:
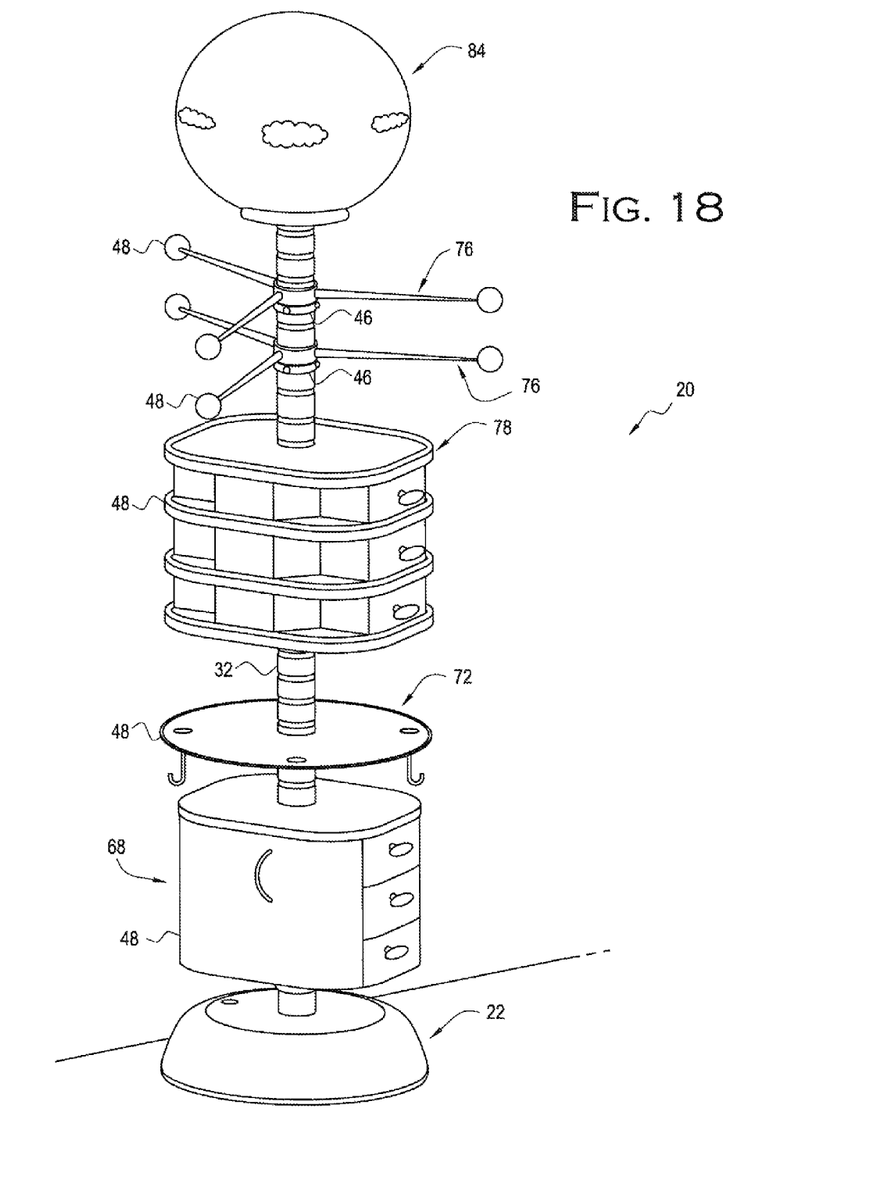
FIG. 18 is a perspective view of an arrangement of the multi-functional infant care and organizer system according to the present invention.

Referring now additionally to FIG. 18, still another configuration of the system 20 according to the present invention is now described in greater detail. More specifically, the system may be used as a multi-functional storage unit that may take the place of one or more pieces of furniture such as, for example, a dresser and light stand. A globe type lamp 84, a plurality of hangers 76, a storage unit 78, a spin table 72 and another storage unit 68 may all be connected to an upper portion of the main body member 32. This type of unit advantageously provides a user with several places to hang items and several places to store items within drawers, or other storage compartments, as well as a table upon which to lay various items, i.e., wallet, keys, cell phone, etc. The system 20 illustrated in FIG. 18 advantageously illustrates just one example of how this system can be used after there is no longer a need to provide infant care, i.e., after the infant has outgrown many of the functions described in FIGS. 1-3. Accordingly, the system 20 accordingly to the present invention advantageously provides longevity in several different uses outside of the infant care arena. Similar to the systems 20 illustrated in FIGS. 1-3, this system may be customizable in many different ways, and the layout of the unit members 48 illustrated in FIG. 18 is merely exemplary and not meant to be limiting in any way.

Figure 19:
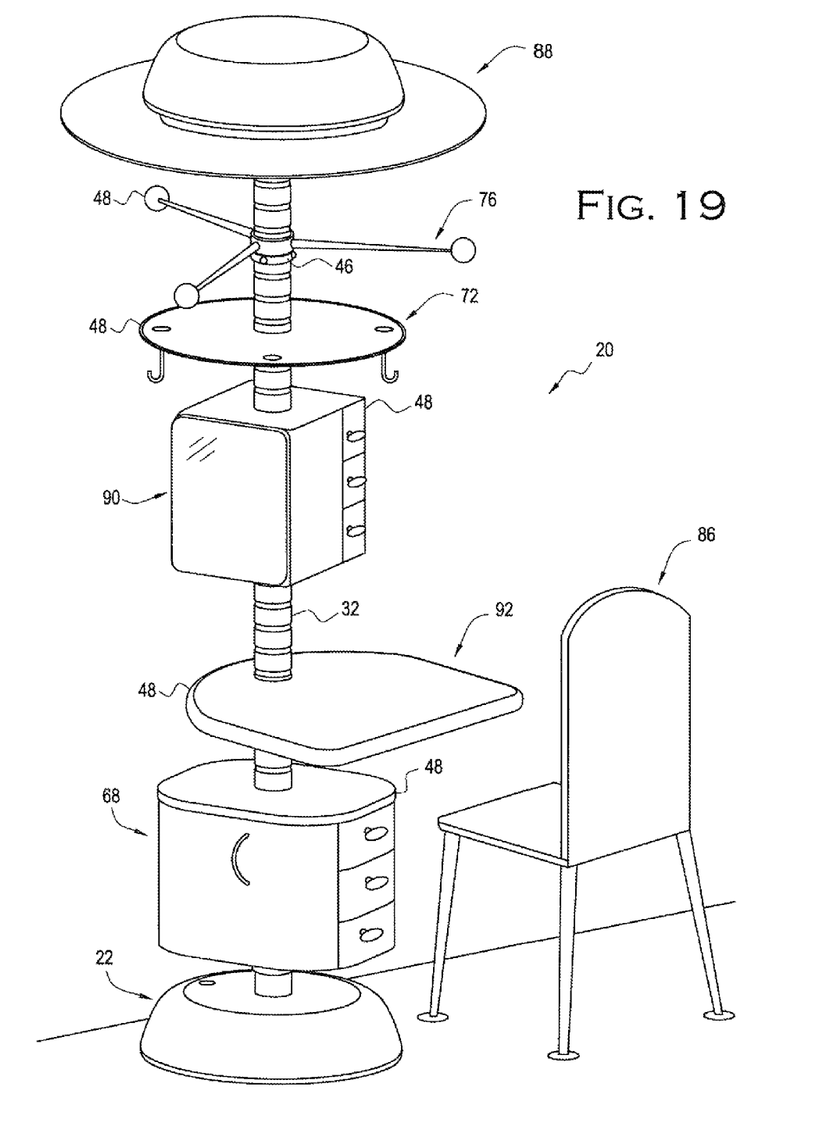
FIG. 19 is a perspective view of yet another arrangement of the multi-functional infant care and organizer system according to the present invention.

Referring now additionally to FIG. 19, a configuration of the system 20 according to the present invention for use as a work station or desk is now described in greater detail. The system 20 illustrated in FIG. 19 may include a work light 88 connected to a top portion of the main body member 32, a hanger 76, a table 72, a storage unit 90, a desk unit 92, and an additional storage unit 68, each of which are connected to the main body member. The desk unit 92 may engage the main body member 32 at a suitable height so that a user may access the desk unit using a chair 86. The system 20 of the present invention contemplates that the changing table 70 may have a dual purpose and may function as a desk unit 92 as well. More specifically, it is contemplated that the unit member 48 may be provided by a changing table on one side, and may be provided by a desk unit 92 on the opposing side. The configuration of the system 20 illustrated in FIG. 19 is yet another example of a way that the system advantageously provides longevity and can be used outside of the infant care arena. Similar to the other descriptions of the system illustrated in previous Figures, the unit members 48 illustrated in FIG. 19 may be positioned anywhere along the main body member 32, and other unit members not shown may also be used as desired by the user.

Those skilled in the art will appreciate that the system 20 contemplates providing more than one base member 22. In such a case, the upper main body member 34 and the lower main body member 36 may be individually connected to each of the base members 22 advantageously providing multiple systems. This advantageously allows for existing unit members 48 to be readily used on more than one system 20 without the need to purchase additional unit members for a second system. Although the second system 20 may be shorter in height than a system including an upper main body member 34 and a lower main body member 36, such a system may serve alternate functions, i.e. kids bedside table & lamp, kids drink table or kids hanger.

Other unit members 48 that may be included in the system 20 according to the present invention may, for example, be a black board and a dry erase board. This provides the system 20 according to the present invention that can be used in several other arenas outside the home, for example. More particularly, this advantageously allows the system 20 according to the present invention to be used for instructional purposes. Using the system 20 according to the present invention for instructional purposes advantageously enhances space saving solutions for classrooms which may be overly burdened with number of students, and that may need additional classroom space. The system 20 according to the present invention may also be used as a feeding station. The feeding station may, for example, include a high chair or booster seat that may connect to the main body member 32 and that may be configured so that the infant or child can sit on the high chair or booster seat, and use a table, also connected to the main body member to eat.

The present invention contemplates the possibility of providing each component of the system 20 separately so that a user may purchase and configure their system pursuant to their needs. For example, the base member 22 may be packaged and sold separately from the main body member 32, the unit carrying members 46 and the unit members 48. It is also contemplated that certain configurations may be pre-packaged and sold together as a single unit. For example, a bath configuration system, as illustrated in FIG. 2, may be pre-packaged and include a base member 22, the main body member 32, and all of the components associated with a bath configuration system. This advantageously allows a user to purchase a system 20 configured in the manner in which is desirous for their particular needs, and to also allow the user to customize the system with additional unit members 48 at a later time as needed.

A method aspect of the present invention is for using the system 20 according to the present invention. The method may include detachably connecting the main body member 32 to the base 22, detachably connecting the unit carrying members 46 to the main body member, and slidably connecting the unit members 48 to the main body member so as to be supported by the unit carrying member. The method may also include vertically moving the unit members 48 along the main body member 32, and fixing the vertical position of the unit members along the main body member using the unit carrying members 46. The method may further comprise rotating the main body member 32 using the unit carrying member 46, and fixing the rotational position of the unit members 48 with respect to the main body member.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A multi-functional infant care and organizer system comprising:
    a base member;
    an elongate main body member detachably connected to and extending upwardly from the base member;
    at least one unit carrying member that is moveably connected to the main body member; and
    at least one respective unit member slidably and rotatably connected to the main body member and supported by the at least one unit carrying member when slidably connected to the main body member;
    wherein the at least one unit carrying member includes at least one height fixing member that engages the main body member to fix the height position of the at least one unit carrying member with respect to the main body member;
    wherein the at least one unit carrying member includes at least one rotation stopping member that engages the main body member to fix the orientation of the at least one unit carrying member with respect to the main body member;
    wherein a first height fixing member is positioned on a perimeter of the at least one unit carrying member opposite a second height fixing member positioned on the perimeter of the at least one unit carrying member;
    wherein the at least one rotation stopping member is positioned on the perimeter of the at least one unit carrying member between the first height fixing member and the second height fixing member.

2. A system according to claim 1 wherein the base member comprises a lower base member and an upper base member connected to and adapted to overlie the lower base member.

3. A system according to claim 2 wherein the upper base member includes at least one opening and is adapted to receive a weighted material.

4. A system according to claim 1 wherein the main body member includes an upper main body member and a lower main body member threadably connected to one another; wherein the lower main body member is threadably connected to the base member; and wherein each of the upper and lower main body members are substantially tubular.

5. A system according to claim 1 wherein the main body member includes a plurality of spaced apart grooves formed on an outer surface portion thereof, each of the plurality of spaced apart grooves being aligned substantially parallel with one another, and extending substantially about the circumference of the main body member.

6. A system according to claim 5 wherein the at least one unit carrying member engages at least one of the plurality of grooves and wherein each of the plurality of grooves represents a different height that the at least one unit carrying member can be positioned at.

7. A system according to claim 6 wherein the at least one unit carrying member includes at least one height fixing member that engages a portion of the main body member to fix the height position of the at least one unit carrying member with respect to the main body member.

8. A system according to claim 7 wherein the at least one unit carrying member includes at least one rotation stopping member that engages a portion of the main body member to fix the orientation of the at least one unit carrying member with respect to the main body member.

9. A system according to claim 8 wherein each of the at least one height fixing member and the at least one rotation stopping member includes at least one pin member that moveably extends outwardly from an inner peripheral portion of the at least one unit carrying member between an engaged position and a disengaged position; wherein the engaged position is defined by the at least one pin member being in contact with a portion of the main body; and wherein the disengaged position is defined by the at least one pin member being spaced apart from the main body so that the at least one unit carrying member is moveable along and about the main body member.

10. A system according to claim 1 wherein the at least one unit member is at least one of a storage unit, a changing station, a table, a light, a hanger, a bath pod, entertainment unit, an infant hammock, an infant mobile, a music box, and a drawing surface.

11. A system according to claim 10 wherein any combination of units are selectively detachably connected to the main body member.

12. A multi-functional infant care and organizer system comprising:
- a lower base member;
- an upper base member connected to and adapted to overlie the lower base member;
- an elongate main body member detachably connected to and extending upwardly from the base member, and including a plurality of spaced apart grooves formed on an outer surface portion thereof, each of the plurality of spaced apart grooves being aligned substantially parallel with one another, and extending substantially about the circumference of the main body member;
- at least one unit carrying member that is moveably connected to the main body member to engage at least one of the plurality of grooves, each of the plurality of grooves representing a different height that the at least one unit carrying member can be positioned at; and
- at least one respective unit member slidably and rotatably connected to the main body member and supported by the at least one unit carrying member when slidably connected to the main body member;
- wherein the at least one unit carrying member includes at least one height fixing member that engages the at least one groove to fix the height position of the at least one unit carrying member with respect to the main body member;
- wherein the at least one unit carrying member includes at least one rotation stopping member that engages the at least one groove to fix the orientation of the at least one unit carrying member with respect to the main body member;
- wherein a first height fixing member is positioned on a perimeter of the at least one unit carrying member opposite a second height fixing member positioned on the perimeter of the at least one unit carrying member;
- wherein the at least one rotation stopping member is positioned on the perimeter of the at least one unit carrying member between the first height fixing member and the second height fixing member;
- wherein a water-tight cavity is formed by connecting the upper base member to the lower base member;
- wherein the upper base member includes at least one opening permitting access to the water-tight cavity and the water-tight cavity is adapted to receive a weighted material.

13. A system according to claim 12 wherein the main body member includes an upper main body member and a lower main body member threadably connected to one another; wherein the lower main body member is threadably connected to the base member; and wherein each of the upper and lower main body members are substantially tubular.

14. A system according to claim 12 wherein each of the at least one height fixing member and the at least one rotation stopping member includes at least one pin member that moveably extends outwardly from an inner peripheral portion of the at least one unit carrying member between an engaged position and a disengaged position; wherein the engaged position is defined by the at least one pin member being in contact with a portion of the main body; and wherein the disengaged position is defined by the at least one pin member being spaced apart from the main body so that the at least one unit carrying member is moveable along and about the main body member.

15. A system according to claim 12 wherein the at least one unit member is at least one of a storage unit, a changing station, a table, a light, a hanger, a bath pod, entertainment unit, an infant hammock, an infant mobile, a music box, and a drawing surface.

16. A system according to claim 15 wherein any combination of units are selectively detachably connected to the main body member.

17. A method of using a multi-functional infant care and organizer system including a base member, an elongate main body member, at least one unit carrying member including at least one height fixing member, a first height fixing member positioned on a perimeter of the at least one unit carrying member opposite a second height fixing member positioned on the perimeter of the at least one unit carrying member, and at least one respective unit member supported by the at least one unit carrying member, the method comprising:
- detachably connecting the elongate main body member to the base member;
- detachably connecting the at least one unit carrying member to the main body member using the first height fixing member and the second height fixing member so that the at least one unit carrying member is movably connected to the main body member; and
- slidably connecting the at least one respective unit member to the main body member so that the respective at least one unit member is supported by the at least one unit carrying member when slidably connected to the main body member.

18. A method according to claim 17 wherein the base member comprises a lower base member and an upper base member connected to and adapted to overlie the lower base member; wherein a water-tight cavity is formed by connecting the upper base member to the lower base member; wherein the upper base member includes at least one opening permitting access to the water-tight cavity and the water-tight cavity is adapted to receive a weighted material; and further comprising filling the water-tight cavity with a weighted material.

19. A method according to claim 17 wherein the main body member includes an upper main body member and a lower main body member; and further comprising threadably connecting the upper main body member to the lower main body member, and threadably connecting the lower main body member to the base member.

20. A method according to claim 17 wherein the main body member includes a plurality of spaced apart grooves formed on an outer surface portion thereof, each of the plurality of spaced apart grooves being aligned substantially parallel with one another, and extending substantially about the circumference of the main body member.

21. A method according to claim 20 further comprising engaging the at least one unit carrying member with at least one of the plurality of grooves so that the at least one unit carrying member can be positioned at various heights.

22. A method according to claim 21 further comprising engaging the at least one height fixing member with at least one of the grooves to fix the height position of the at least one unit carrying member with respect to the main body member; and wherein the at least one unit carrying member includes at least one rotation stopping member positioned on the perimeter of the at least one unit carrying member between the first height fixing member and the second height fixing member and further comprising engaging the at least one rotation stopping member with at least one of the grooves to fix the orientation of the at least one unit carrying member with respect to the main body member.

23. A method according to claim 21 wherein each of the at least one height fixing member and the at least one rotation stopping member includes at least one pin member; and further comprising moveably extending the at least one pin member outwardly from an inner peripheral portion of the at least one unit carrying member between an engaged position and a disengaged position; wherein the engaged position is defined by the at least one pin member being in contact with a portion of the main body; and wherein the disengaged position is defined by the at least one pin member being spaced apart from the main body so that the at least one unit carrying member is moveable along and about the main body member.

24. A method according to claim 17 wherein the at least one unit member is at least one of a storage unit, a changing station, a table, a light, a hanger, a bath pod, an entertainment unit, an infant hammock, an infant mobile, a music box, and a drawing surface.

25. A method according to claim 24 wherein any combination of units are selectively detachably connected to the main body member.

* * * * *